United States Patent [19]

Loria et al.

[11] 4,097,637

[45] Jun. 27, 1978

[54] LATENT IMAGING MASTER

[75] Inventors: Adrian M. Loria, Evanston; Richard E. Thomas, Chicago, both of Ill.

[73] Assignee: A. B. Dick Company, Niles, Ill.

[21] Appl. No.: 671,137

[22] Filed: Mar. 29, 1976

[51] Int. Cl.[2] .......................... B32B 5/16; B32B 7/02; B41M 5/04

[52] U.S. Cl. .................................... 428/212; 346/153; 346/163; 358/285; 427/152; 428/914

[58] Field of Search ............... 346/162, 163, 164, 165, 346/153; 428/212, 323, 914; 427/152

[56] References Cited

U.S. PATENT DOCUMENTS

| | | | |
|---|---|---|---|
| 2,664,043 | 12/1953 | Dalton | 346/163 |
| 2,664,044 | 12/1953 | Dalton | 346/162 |
| 2,940,941 | 6/1960 | Dalton | 346/163 |
| 3,158,506 | 11/1964 | Ellison | 346/164 |
| 3,255,039 | 6/1966 | Dalton | 346/165 |
| 3,265,531 | 8/1966 | Pribble | 346/164 |
| 3,442,699 | 5/1969 | Dalton | 346/165 |
| 3,789,425 | 1/1974 | Matsushima | 346/163 |
| 3,861,952 | 1/1975 | Tokumoto et al. | 346/164 |
| 3,920,873 | 11/1975 | Diamond | 346/163 |

*Primary Examiner*—J.C. Cannon

*Attorney, Agent, or Firm*—McDougall, Hersh & Scott

[57] ABSTRACT

A master adapted to be imaged in the manner of an electronic stencil for use in producing multiple copies containing latent images in which the master comprises a base sheet having multiple coatings including a first coating containing an alcohol and/or water soluble colorless colorforming component and a highly electrically conductive coating overlying the first coat and which, in addition, contains a less highly electrically conductive coating overlying the highly electrically conductive coating and a masking coat as the top coat.

12 Claims, 5 Drawing Figures

FIG. 1
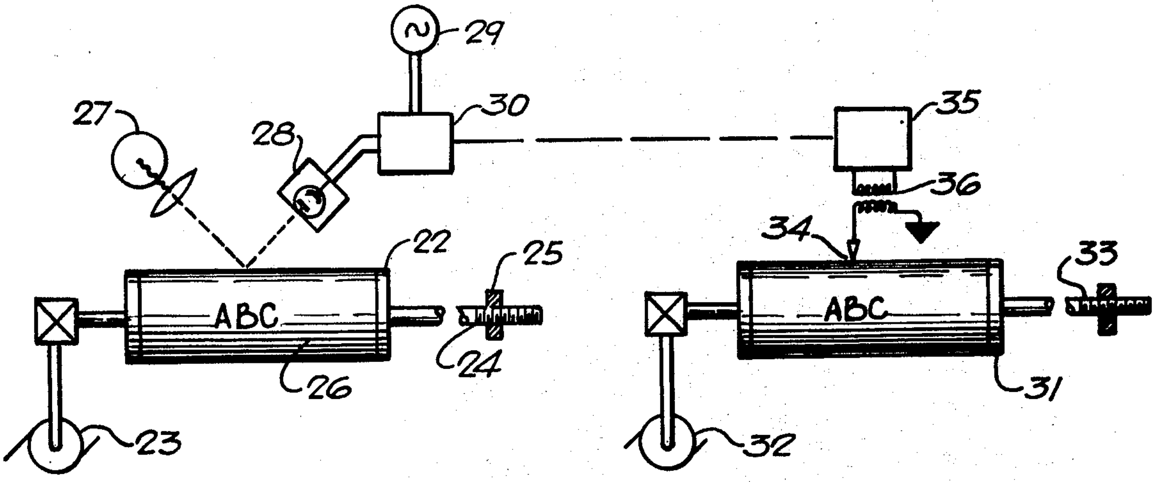
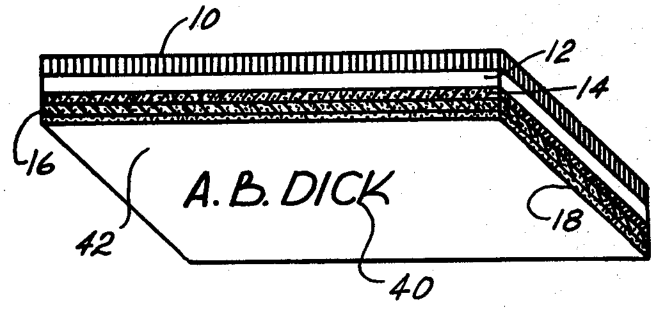
FIG. 2
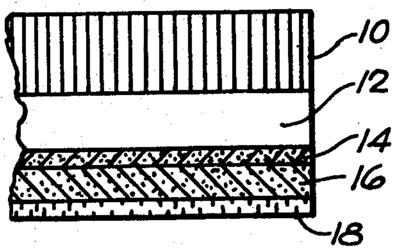
FIG. 3
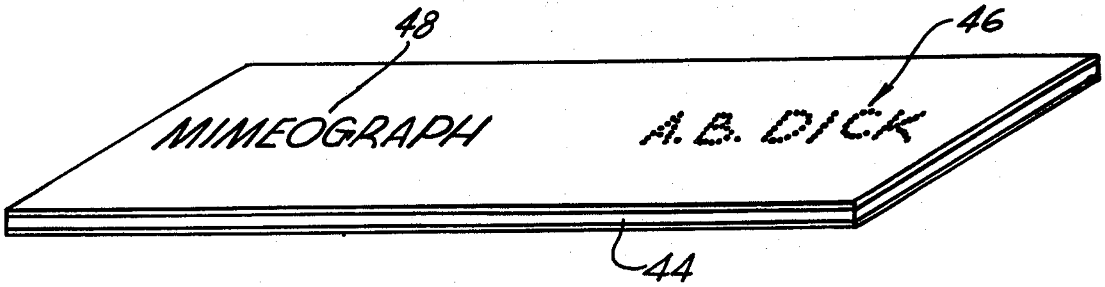
FIG. 4
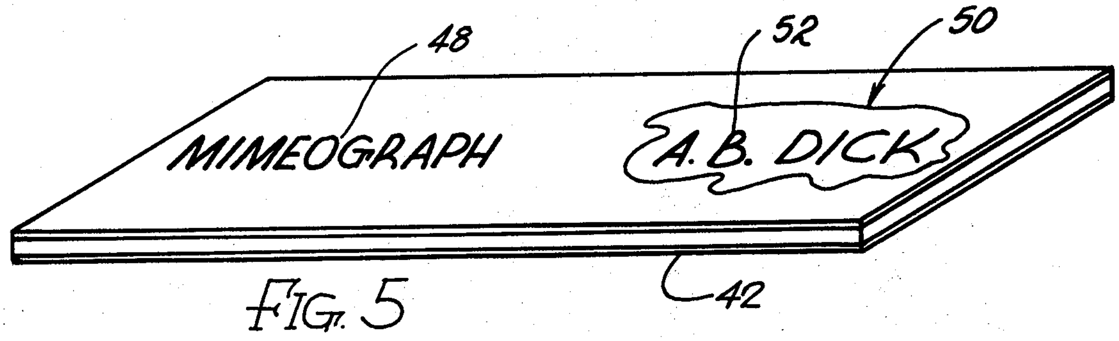
FIG. 5

LATENT IMAGING MASTER

This invention relates to an imaged master from which multiple copies, bearing latent images, can be produced and it relates further to the master and method for imaging the master in the preparation of the latent imaged master.

The art is lacking in an inexpensive means and method for producing chemical latent images for use in the intermediate copy range, as required for commercial adoption in self-instruction and testing systems.

It is an object of this invention to provide a master which can be imaged in a simple facsimile manner to provide an imaged master from which multiple copies with chemical latent images can be produced by a common, inexpensive duplication technique, using equipment of the type heretofore employed in the well known duplicating processes, commercially known as offset or spirit duplication.

It is a further object of this invention to provide a latent imaged master of the type described which eliminates many of the objectionable features of producing such a master and copies by conventional direct image latent spirit duplicating techniques; which avoids the more expensive procedures which required the preparation of relief plates for printing in the intermediate impression range; which makes use of a low cost master that can be easily prepared of low cost and readily available materials; in which the imaging of the master can be effected in a simple manner with readily available equipment; in which the imaged master can be employed without the need to make use of corrosive inks and in which the master can be imaged in a rapid manner to provide fast turn-around time.

These and other objects and advantages of this invention will hereinafter appear and, for purposes of illustration but not of limitation, an embodiment of the invention is shown in the accompanying drawings, in which:

FIG. 1 is a schematic diagram of a typical manner of preparing the imaged master by a type of facsimile process;

FIG. 2 is a perspective view showing the construction of the master embodying the features of this invention;

FIG. 3 is an enlarged cross-sectional view of the master shown in FIG. 2.

FIG. 4 is a perspective view of the copy of FIG. 2 after imaging; and

FIG. 5 is a perspective view of the copy sheet in which the invisible image transferred from the imaged master of FIG. 4 has been made visible.

Briefly described, the concepts of this invention are embodied in the preparation of a duplicating master in which the invisible image forming material is leached from the master through perforations formed through overcoating by facsimile technique, using an electronic device for cutting such perforations in response to the scanning of an original.

For this purpose, use is required to be made of a new and unique master sheet fabricated of a number of integrally bonded layers, applied as coatings onto a suitable substrate 10.

The substrate can be a plastic film or laminate but it is preferred to make use of a base paper of intermediate weight suitable for use as a base sheet onto which to build the coatings required for the duplicating master.

The base coating 12 on the base sheet 10 is a coating which is formulated to contain, as an essential ingredient, a water and/or alcohol soluble colorless color-forming component to be leached from the imaged master to the copy sheets to form latent images thereon.

The following are representative of such water and/or alcohol soluble colorless color-forming components which are formulated into the base coating 12 and the corresponding reactants for development of visible images by reaction therewith in the copy sheets.

| Colorless component | Color reactant (F) |
|---|---|
| 1. Citric Acid | 1. Leuco Dye CP-1 (Allied) Chemical) |
| 2. Citric Acid | 2. Heat |
| 3. Oxchek[R] H (Hilton-Davis) | 3. Sodium Hypochlorite |
| 4. Phenolphthalein (retreatable) | 4. Alkali (temporary) |
| 5. Gallic Acid | 5. Ferric Chloride |
| 6. Dimethylglyoxime | 6. Nickel Acetate |
| 7. Cupric Chloride | 7. Dithiooxamide |
| 8. Cupric Chloride | 8. Hematoxylin |
| 9. Cupric Chloride/(starch) | 9. Potassium Iodide |
| 10. Potassium Ferricyanide | 10. Iron Salts |
| 11. Cobaltous Chloride | 11. Heat |
| 12. Ferric Sulphate | 12. Tannic Acid |
| 13. Uranine | 13. Ultra-violet Light |
| 14. Uranyl Nitrate | 14. Ultra-violet Light |

EXAMPLE 1

Composition for base coating 12:

30 parts by weight colorless component from the above 4 parts by weight binder (polyvinyl alcohol — Elvanol 52-42, Du Pont)

100 parts by weight water

The colorless component and binder are dispersed and/or dissolved in the water to provide an aqueous coating composition which is applied to the substrate 10 in an amount to provide a dry coating weight of 20-25 lbs./3000 sq. ft. The composition can be applied by conventional coating techniques, such as flow coating, roller coating, brush coating and the like, followed by passage through an air drying oven heated to a temperature of 150°-350° F for drying the coating.

Instead of making use of polyvinyl alcohol as the binder, use can be made of other water soluble or readily water dispersible high molecular weight or polymeric materials such as highly hydrolyzed polyvinyl acetate, carboxymethyl cellulose, methyl cellulose, starch, casein and the like. The binder component functions to anchor the base coating 12 to the base sheet 10. For this purpose, the concentration of the binder can range from 1 part by weight to 30 parts by weight per 100 parts by weight of the colorless color-forming component, and preferably within the range of 1 to 10 parts by weight per 100 parts by weight of the colorless color-forming component.

Highly electrically conductive coating 14

The essential component in coating 14 is conductive particles which render the coating electrically conductive. Such electrically conductive particles may be represented by colloidal carbon or electrically conductive carbon such as carbon black, acetylene black or Dixie Black of Union Carbide.

EXAMPLE 2

Composition for electrically conductive coating 14:

4 parts by weight carbon black (Conductex 950 — Columbia Carbon Co.)

4.8 parts by weight dioctyl phthalate 65 parts by weight toluene 60 parts by weight methyl ethyl ketone 4 parts by weight polyvinyl resin (VC-171C, Borden Chemical Co.)

The above ingredients are ground in a ball mill for from 12 to 24 hours to form a dispersion. Instead of a ball mill, use can be made of a roller mill for milling the ingredients into a smooth dispersion for overcoating the layer 12. The coating composition is overcoated onto the dry layer 12 as by brush coating, roller coating, flow coating, coating with a doctor blade or the like in a coating weight of 2-3 lbs./3000 sq. ft. of surface area.

In the electrically conductive coating, it is desirable to anchor the coating and to bond the electrically conductive particles in the coating with a binder that is not water or alcohol soluble but instead is solvent soluble whereby an organic solvent or combination of organic solvents are employed for use as the diluent in the coating composition.

Instead of the vinyl polymer resin, use can be made of other high polymeric or resinous materials such as nitro cellulose, polyvinylidene chloride resin, acrylonitrile polymer and copolymer resins, vinylite resins, such as VYHH, VYNS or VYNZ of Union Carbide. It is desirable to make use of a thin layer of the electrically conductive material, such as in coating weights of less than 8 lbs./3000 sq. ft. and preferably between 1-4 lbs./3000 sq. ft. of surface area.

It is sufficient if the amount of binder is 50% by weight of the electrically conductive material in the coating but it is undesirable to make use of an amount of binder which is greater than 200% by weight of the electrically conductive material. In the preferred practice the ratio of binder to electrically conductive material in the coating may vary from 0.75 to 1.5 parts by weight of binder to 1 part by weight of electrically conductive material.

The applied coating 14 can be allowed to air dry but it is preferred to accelerate drying by air drying at elevated temperature in the range of 150°-350° F.

Lower Electrically Conductive Coating 16

Coating 16 is essential to the master. Electrically conductive coating 16 also contains an electrically conductive material, as an essential component, but the coating is designed to have lower electrical conductivity than the highly electrically conductive coating 14 so as to provide an electrical gradient of increasing conductivity in the direction towards the base sheet 10. For this purpose, use is made of electrically conductive particles of the type used to form the electrically conductive component in coating 14, but in a much lower concentration of electrically conductive material to binder.

EXAMPLE 3

Composition for electrically conductive coating 16:

3.8 parts by weight carbon black (Conductex SC — Columbia Carbon Co.)

0.5 part by weight lecithin (5F-UB — Central Soya)

100 parts by weight methyl ethyl ketone 23.4 parts by weight vinyl resin (VC 171C, Borden Chemical Co.)

6.5 parts by weight dioctyl phthalate 43.3 parts by weight toluene 0.1 part by weight hydrophobic silica (Tullanox 500, Tulco. Inc.)

The ingredients are milled or otherwise ground, as in Example 2, and applied as an overcoating onto coating 14 in an amount to provide a dry coating weight of 12-15 lbs./3000 sq. ft. of surface area. The applied coating is then dried as in the preceding example.

The essential components, namely the binder and the electrically conductive materials, may be selected of the same materials as the binder components and electrically conductive materials suitable for use in the preparation of the electrically conductive coating 14.

The ratio of electrically conductive particles to binder in the lower electrically conductive coating 16 may range from 1 part by weight electrically conductive material to 3 to 10 parts by weight of binder and preferably 1 part by weight of electrically conductive material to 5 to 8 parts by weight of binder. The coating 16 of lower conductivity is applied in coating weight considerably greater than in the coating 14 of higher conductivity, such as in coating weights of 8-20 lbs. and preferably 12-15 lbs./3000 sq. ft. of surface area, which is more than about four times the coating weight of the highly electrically conductive coating 14.

Masking Coating 18

Coating 18 is a contrasting coating that is applied primarily for the purpose of providing readability of the image that is subsequently formed on the coated master. Thus the masking layer 18 is not a coating that is essential to the master of this invention but its presence materially benefits the utility of the master and the proofreading of the imaged master before use in the production of copy.

EXAMPLE 4

Composition for masking coating 18:

6.5 parts by weight zinc oxide (Photox 80 Zn0 - New Jersey Zinc Co.)

5.3 parts by weight polymethyl methacrylate (Elvacite-2046-DuPont)

60 parts by weight toluene 24.3 parts by weight n-butanol 2.5 parts by weight sulfonamide formaldehyde resin dye (B-3539 Lemon Yellow — Lawter)

0.1 part by weight pigment (C.I. pigment green 7) (polychloro copper phthalocyanine or Sherwood Green — Hercules Chemical Co.)

This is primarily a color coating in which various other dye components or pigments can be used and which includes a binder such as casein, phenol formaldehyde, urea formaldehyde, alkyd resin, polystyrene, methyl methacrylate, polymethyl methacrylate or other polyacrylates, polyurethane, butadiene-styrene copolymer, cellulose acetate, and the like. The ingredients are milled or ground as in the preceding Examples and 3, and applied by conventional casting techniques, in coating weights within the range of 0.25 to 2 and preferably 0.5-1 lbs./3000 sq. ft. of surface area.

The coated master is adapted to be imaged by perforating the coating 14 and coatings 16 and 18, when present, in the image forming areas. Such perforations are formed in response to electrical signals controlled by a scanned original. Apparatus suitable for use in perforating the coatings on the master is schematically shown in FIG. 1 which includes a conventional facsimile transmitter comprising a scanning drum 22 which is adapted to be rotated at a suitable speed by an electrical motor 23. Simultaneously, the drum 22 is displaced axially as by means of a lead screw 24 and a split nut 25.

The sheet 26 inscribed with the original is wrapped around the drum 22.

Associated with the drum is a scanning head 26 of conventional construction, comprising a scanning light source 27 and a photoelectric cell 28 for transmitting the light and dark patterns of the original into corresponding electrical signals. These signals are then applied to modulate an audio frequency carrier from the carrier source 29 through an amplifier modulator unit 30.

At the receiving station, there is provided a scanning drum 31 which may be similar to drum 22. Drum 31 is rotated and advanced in synchronism with the drum 22 by means of the electrical motor 32 and lead screw 33.

The master, prepared in accordance with the practice of the invention, is wrapped around the drum 31 with the coated side up. Cooperating with the mounted master is a recording conductive stylus 34 which is supplied with electrical energy from the receiving amplifier 35, preferably through a transformer 36 connected to the transmitter amplifier 30.

The electrical signals produce perforations through the coatings 14 and 16, as well as 18, when present, in localized areas corresponding to the image of the original. When the recording has been completed, the master is formed with multiple perforations 40 in the imaged areas, for enabling access through the coating and to the material in coating 12.

When it is desired to transmit the latent image to copy sheets 44, the imaged master in FIG. 2 is mounted on the drum of an offset duplicator, for convenience and registration, or may be mounted on the drum of a spirit duplicator. The water and/or alcohol is supplied by the fountain train to the master surface with the ink train disengaged in the case of offset.

When the master 42 in FIG. 2 is wetted with the aqueous or spirit fluid, and brought into contact with the surface of the copy sheet 44, colorless component is dissolved by the fluid and leached from the layer 12 through the perforations 40 in FIG. 2 to the copy sheet 44, to form the latent image 46 thereon. The copy sheet or impression paper may contain visible portions 48 in registry with the latent imaged portion to aid in the one-time or reusable feed back system, as illustrated in FIG. 5.

At the time desired, the colorless latent image can be rendered visible by treatment with an energy source or chemical component 50 which reacts and/or reveals an visible image 52 in the latent image area 46. Representative of such materials are the components aligned with the colorless color-forming component in the preceding tabulation.

The developer may be in the form of a liquid dispersion, solution, emulsion or energy source which can be applied to the latent image. Instead, it can be incorporated into a solid, as in a crayon, or the reactant can be transmitted to the latent image in the form of a vapor which can be heat or light generated. The latent image is thus developed into a permanent or temporary visible image 52, as illustrated in FIG. 5.

It will be apparent from the foregoing that we have provided a simple and more efficient master and a method for imaging the master for use in the preparation of multiple copies containing colorless latent images which can be subsequently developed by the exposure of materials in the latent image with a developer that can be applied in the form of a liquid, solid, vapor, energy source to form a visible colored readable image 52.

Such copy sheets, with latent colorless images in registry with visible images, find wide usage as a teaching, instructional, or examination material in the education or information field.

It will be understood that changes may be made in the details of formulation, arrangement and operation without departing from the spirit of the invention, especially as defined in the following claims.

We claim:

1. A master for producing multiple latent imaged copies comprising a base sheet and multiple coatings on the surface of the base sheet including a base coat containing a water and/or alcohol soluble colorless color-forming component and at least two electrically conductive coatings overlying the base coat containing electrically conductive particles arranged to provide an electrical gradient of increasing conductivity in the direction towards the base coat.

2. A master as claimed in claim 1 which includes a masking coat on the electrically conductive coatings as a top coat in which the masking coating is a coating of a contrasting color by comparison with the underlying coating to provide readability of the image that is formed in the master.

3. A master as claimed in claim 1 in which the electrically conductive particles are electrically conductive carbon.

4. A master as claimed in claim 1 in which the multiple electrically conductive coatings contains a water insoluble binder.

5. A master as claimed in claim 1 in which the multiple electrically conductive coatings includes a first electrically conductive coating and a second coating overlying the first electrically conductive coating which contains electrically conductive particles in a concentration less than in the underlying first overcoating.

6. A master as claimed in claim 5 in which the second coating a solvent soluble binder in the ratio of 1 part by weight electrically conductive particles to 3 to 10 parts by weight of binder.

7. A master as claimed in claim 5 in which the second coating contains a solvent soluble binder in the ratio of 1 part by weight electrically conductive particles to 5 to 8 parts by weight of binder.

8. A master as claimed in claim 1 in which the base coating contains a binder component in the form of a high molecular weight material which is soluble or dispersible in aqueous medium.

9. A master as claimed in claim 8 in which the colorless color-forming component and binder are present in the base coating in the ratio of 1–30 parts by weight binder to 100 parts by weight of colorless color-forming component.

10. A master as claimed in claim 8 in which the colorless color-forming component and binder are present in the base coating in the ratio of 1–15 parts by weight binder to 100 parts by weight of colorless color-forming component.

11. A master as claimed in claim 1 in which the first of the electrically conductive coatings contains a water insoluble binder in the ratio of 0.5 to 2 parts by weight of binder to 1 part by weight of electrically conductive particles.

12. A master as claimed in claim 11 in which the materials are present in the second conductive coating in the ratio of 0.75 to 1.5 parts by weight binder to 1 part by weight of electrically conductive particles.

* * * * *